2,065,157
Patented Nov. 20, 1962

3,065,157
PROCESS FOR MODIFYING POLYMERS AND PRODUCTS THUS OBTAINED
Warren Froemming Busse, Wilmington, Del., assignor to E. I. du Pont de Nemours and Company, Wilmington, Del., a corporation of Delaware
No Drawing. Filed June 11, 1956, Ser. No. 590,374
8 Claims. (Cl. 204—154)

This invention relates to an improved process for modifying polymers to increase strength and stiffness at temperatures above the crystalline melting point, and to improve resistance to solvents. It also relates to certain products obtained by the said process.

It has been well known for many years that polymeric materials become modified when subjected to bombardment with highly accelerated electrons or nuclear particles. Some polymers such as polymethyl methacrylate and polyisobutylene tend to degrade under such treatment, while others such as polyethylene, natural rubber, butadiene copolymers, polyvinyl chloride, polyamides (nylon), polyesters, and vinyl ($CH_2=CH-$) polymers in general, undergo cross-linking. It has also been known that graft polymers can be produced by subjecting certain polymers to the action of particular monomers while irradiating the mixture. It has also been known that various sources of free radicals such as organic peroxides, metal alkyl compounds and the like, have the effect of cross-linking polymers, in general, whether saturated or unsaturated.

The methods hereinabove described are effective but somewhat expensive for widespread use on a large scale because of the time factor involved in treating large quantities of polymer.

It has now been discovered in accordance with the present invention that certain momomeric materials described hereinbelow, exemplified by tetrafluoroethylene, have the extraordinary property of accelerating the cross-linking of polymers by high energy particles thus increasing very greatly the speed with which cross-linked polymers can be made on a large scale. The conditions employed involve control of ratio of the weight of polymer to the weight of monomer, exposure time and intensity of radiation, as described below, to produce cross-links rapidly.

The polymers which can be treated by the process of this invention include linear polyamides, polyvinyl acetals, halogenated and halosulfonated alkene-1 polymers (including interpolymers) and polymers of vinyl compounds. Among the latter may be mentioned vinyl hydrocarbons, such as ethylene, propylene, decene-1, isoprene, styrene; vinyl alcohol, vinyl chloride, vinyl alkyl ethers, divinyl ethers, chloroprene, allyl esters, vinyl silanes, vinyl fluoride, vinyl esters or carboxylic acids, and the like.

The monomers which may be employed constitute a class which is made up of the following members: tetrafluoroethylene, hexafluoropropene, and perfluorocyclobutene.

The radiation which is employed in the practice of this invention is composed of high energy particles, and by "high energy particle radiation" is meant an emission of highly accelerated electrons or nuclear particles, such as protons, neutrons, alpha particles, deuterons, beta particles or the like, so that the said particle impinges on the polymer in contact with the monomer. The charged particles may be accelerated to high speeds by means of suitable voltage gradient, using such devices as a resonant cavity accelerator, a Van de Graaff generator, a betatron, a synchrotron, cyclotron, or the like as is well known to those who are skilled in the art. Neutron radiation may be produced by bombardment of selected light metal (e.g. beryllium) targets with high energy positive particles. In addition, particle radiation suitable for carrying out the process of the invention may be obtained from an atomic pile, or from radioactive isotopes or from other natural or artificial radioactive materials.

The expression "standard pass" as employed herein is defind to mean the passing of the sample through the beam of 2 mev. electrons at such a rate as to expose each square centimeter to 12.5 watts of radiation energy. For purposes of illustration, this quantity of energy is provided by a source of 250 microamps of 2 mev. electrons bombarding 24 square inches of surface for about one second. A beam of half this current would require an exposure of 2 seconds. In rough approximation, one pass is equal to one mega-roentgen (one million roentgen equivalents physical, one roentgen equivalent physical being the amount of high energy particle radiation which results in energy absorption of 83.9 ergs per gram of water or equivalent absorbing material).

The high speed electrons penetrate the resin to a limited depth, hence if it is desired to assure passage all of the way through the sample, it is necessary to employ samples which have a thickness of not more than about one-quarter to one-half inch. Otherwise, the sample beyond the range of the electrons will be relatively unexposed. On the other hand, where it is desired to produce an unmodified interior, encrusted in a cross-linked shell, there is no need for limiting the thickness of the sample.

A convenient method for practicing the invention is to conduct the polymer in film form, or other suitable physical form, continuously through the beam while maintaining the film in a closed system containing the monomer. The closed system can be maintained by liquid seals if desired. In those instances wherein relatively low amounts of cross-linking are adequate for the intended purposes the polymer can be irradiated in the form of fluff, and subsequently can be milled, extruded or otherwise shaped to the desired form, however, speciments thus treated do not have as high resistance to swelling in solvents or to flow at high temperatures.

In most instances, the radiation source is maintained at about 8 inches from the specimen undergoing treatment, but this is not especially critical. Where the beam of 250 microamperes of 2 mev. electron occupied a cross-section 3 inches wide and 8 inches long, a time passage through the beam at about 1 second for each pass gave an exposure to 12.5 watts per square centimeter.

The temperature during irradiation is suitably room temperature, but any temperature below the decomposition temperature of the polymer may be used. While pressure can be superatmospheric, ordinary pressures, close to one atmosphere are sufficient and are generally preferred. The partial pressure of the monomer may be decreased by adding a diluent inert gas, and this is advantageous in some circumstances, as where a very rapid polymerization in the gas phase may otherwise produce an explosion or produce undesired amounts of polymer from the monomer.

Two methods were used to determine the efficiency of cross-linking during the irradiation. One was to put about 0.25 gram of the sample in the form of a film in 5 cc. of a solvent such as alpha chloronaphthalene and heat it for 4 hours at 150° C. If the sample was cross-linked sufficiently to form a coherent gel, the gel was removed from the liquid, then quickly wiped dry with filter paper, and weighed. The degree of swelling was indicated by the ratio of the liquid absorbed to the initial weight It is well known that the degree of swelling in a given gel system decreases as the number of cross links in the gel increases (Flory, Principles of Polymer Chemistry, Cornell University, Ithaca, N.Y., chapter XIII–3, p. 576). Typical results for the swelling of a standard commercial polyethylene after various numbers of standard passes through the electron beam but without the monomeric modifier are shown in Table A, for purposes of comparison. Although this polyethylene forms the first trace of gel at about 2 standard passes, the gel structure formed at less than 4 or 5 standard passes is incomplete, and the gel which is formed is so weak that the sample partially dissolves and the gel tends to break up on handling it. However, at 5 or more standard passes the swelling data clearly show cross-linking. Above about 6 passes, strong coherent gels are formed, whose swelling is a measure of the degree of cross-linking. If the solvent or the type of polymer were changed, it is be understood that the swelling might also change since the swelling also depends on the energy of interaction between the polymer and the swelling liquid.

TABLE A

*Swelling of Polyethylene vs. Irradiation With High-Energy Electrons, in Absence of Modifier*

| Number of standard passes | Degree of swelling |
|---|---|
| 4 | 19 |
| 6 | 17.5 |
| 8 | 14.5 |
| 10 | 11.3 |
| 12 | 9.4 |
| 14 | 8.3 |
| 16 | 7.6 |
| 20 | 6.7 |
| 30 | 5.3 |

Another test that was used to measure the relative amounts of cross-linking in gels was to stretch a sample under a load of 10 p.s.i. in an oven whose temperature was raised 1° to 2°/min. The elongation was measured at various temperatures until the sample broke. It may be considered that the equilibrium modulus of a cross-linked elastic gel is proportional to the number of cross-links per unit volume (Flory, Principles of Polymer Chemistry, Chapter XI). Hence the more the cross-linking, the lower will be the elongation at a given load and temperature.

Typical values for samples of commercial polyethylenes irradiated 4, 12, 18 and 24 standard passes in air are shown for purposes of comparison in Table B. Here the rapid increase in elongation between 100° and 125° C. is due to the melting of the crystallites. For the samples irradiated 12 to 24 standard passes the elongation stays roughly constant, or may even decrease slightly on raising the temperature from 125° to 150° or 175° C. Above 175° C. the elongation appears to again rise rapidly, usually just before failure.

TABLE B

*Elongation of Irradiated Polyethylene Under a Load of 10 p.s.i. at Elevated Temperatures*

| Number of standard passes | Test temp., °C. | Percent elongation |
|---|---|---|
| 4 | 100 | Less than 2. |
| 12 | 100 | Do. |
| 18 | 100 | Do. |
| 24 | 100 | Do. |
| 4 | 125 | Over 300. |
| 12 | 125 | 85. |
| 18 | 125 | 34. |
| 24 | 125 | 20. |
| 4 | 150 | Broke. |
| 12 | 150 | 90. |
| 18 | 150 | 34. |
| 24 | 150 | 20. |
| 4 | 175 | Broke. |
| 12 | 175 | 97. |
| 18 | 175 | 35. |
| 24 | 175 | 20. |
| 4 | 225 | Broke. |
| 12 | 225 | Do. |
| 18 | 225 | 82. |
| 24 | 225 | 32. |

From the foregoing data it is apparent that, without use of a modifier the cross-linking of polyethylene by irradiation with high speed electrons requires a large number of standard passes.

In contrast with this, when the polyethylene is irradiated in the presence of the monomers herein disclosed, the amount of cross-linking, as measured by swelling or elongation at high temperature, is considerably higher than that of polyethylene irradiated the same number of passes without an additive. This is illustrated in the following examples:

EXAMPLE 1

A specimen of polyethylene film was placed in a polyethylene bag, and the air in the bag was displaced with nitrogen. Following this the nitrogen was replaced with monomeric tetrafluoroethylene, and the bag was sealed. It was then placed on the moving table of a Van de Graaff generator, and subjected to bombardment by 2 mcv. electrons (two exposures at 50 microamps. equivalent to 0.4 standard pass) (run 1). The experiment was repeated, using 5 exposures at 50 microamps. equivalent to one standard pass (run 2). Again the experiment was repeated using 10 passes at 250 microamps, i.e. 10 standard passes (run 3). Control experiments were made with the samples surrounded by air instead of tetrafluoroethylene. The effect of this treatment on the swelling of the resin in alpha chloronaphthalene in 4 hour tests at 150° C. (using 0.25 gram samples in 5 cc. solvent) is shown in the following table:

TABLE 1

*Effect of Electron Bombardment on Polyethylene in the Presence of Tetrafluoroethylene*

| Run | Number of standard passes | Percent swelling when irradiated with— | |
| | | $C_2F_4$ | Air |
|---|---|---|---|
| 1 | 0.4 | Soluble | Soluble |
| 2 | 1.0 | 891 | Soluble |
| 3 | 10 | 508 | 1,130 |

A comparison of these foregoing data with Table A shows that 1 standard pass in the presence of $C_2F_4$ reduced the swelling, or effectively produced as much cross-linking as 11 or 12 standard passes in the presence of air or over a 10-fold increase in effectiveness. Exposure of the polyethylene to 10 passes of irradiation in the presence of $C_2F_4$ was about equivalent to exposing the polyethylene to 32 passes in air or more than a threefold increase in the effectiveness of the exposure.

When the sample was loaded to 10 p.s.i. into an oven and the temperature raised 1° to 2°/min. the changes of elongation shown in Table 2 were observed:

TABLE 2

*Elongation Under 10 p.s.i. Load of Polyethylene Irradiated in the Presence of $C_2F_4$*

| Run | Monomer around sample | Passes | Percent elongation at temp. (° C.) | | | | | | Remarks |
|---|---|---|---|---|---|---|---|---|---|
| | | | 100 | 110 | 125 | 150 | 175 | 200 | |
| 2 | $C_2F_4$ | 1 | 6.3 | 6.8 | 40.0 | 41.6 | 47.9 | | Broke 198° C. |
| 3 | $C_2F_4$ | 10 | 1.5 | 4.0 | 6.9 | 7.4 | 8.4 | | Do. |
| Control | Air | 0 | | | | | | | Broke 100° C. |
| Do | Air | 4 | 2.0 | | 650 | | | | |
| Do | Air | 12 | 1.5 | | 89 | 93 | 98 | 214 | |
| Do | Air | 18 | 1.0 | | 33 | 34 | 35 | 57 | |
| Do | Air | 24 | 3.1 | | 22 | 22 | 23 | 34 | |

It is seen that the elongation at 150° C. of the sample irradiated 1 pass in $C_2F_4$ is between that of the control samples treated 12 passes and 18 standard passes. This again shows that the $C_2F_4$ enhances the effect of 1 pass irradiation by over tenfold. The sample irradiated 10 passes in $C_2F_4$ has a much lower elongation than the control treated 24 passes so the $C_2F_4$ has enhanced the effect of this irradiation dose by much more than 2.4-fold.

The films irradiated by one or more standard passes in the presence of $C_2F_4$ gas also have a very low coefficient of friction around 0.3 to 0.4, compared with a friction of about $0.8 \pm .2$ for the control.

Infrared examinations of the films of runs 3 showed bands 8.25, 8.7, 9.02, and $12.3\mu$ which were not found in polyethylene. Of these, only the bands at 8.25 and $8.7\mu$ appear in polytetrafluoroethylene. This indicates that a new type of compound has been formed.

Some $C_2F_4$ also polymerizes in the gas phase, and settles out as a powder. This is surprising, since it is known that when tetrafluoroethylene is polymerized by the usual free radical initiators and the polymer is then subjected to irradiation, it becomes badly degraded.

EXAMPLE 2

Polyethylene films were treated as in Example 1, but other fluorocarbon monomers were added instead of tetrafluoroethylene. These samples were given 3 and 20 passes under the 2 mev. electron beam. When these films were tested for swelling or for elongation at high temperatures, results shown in Table 3 were obtained:

TABLE 3

*Swelling and Elongation of Polyethylene Irradiated in the Presence of Hexafluoropropylene and Perfluorocyclobutene*

| Run | Monomer | Passes | Percent swelling | Percent elongation at 150°C. and 10 p.s.i. |
|---|---|---|---|---|
| 1 | $C_3F_6$ | 3 | 820 | |
| 2 | $C_3F_6$ | 20 | 395 | 1.0 |
| 3 | $C_4F_6$ | 20 | 350 | |
| Control | | 3 | (¹) | Breaks |
| Do | | 20 | 670 | ² 22 |

¹ Soluble, or got too weak to test.
² For 24 passes.

It is seen according to the foregoing data that irradiating polyethylene for 3 or 20 passes in the presence of $C_3F_6$ reduces the swelling and the elongation at 150° C. far more than a similar irradiation in the absence of the $C_3H_6$, showing that the fluorinated compound has greatly increased the degree of cross-linking.

Similar effects of varying magnitude are shown by the other fluorocarbons listed in the table.

Not all unsaturated compounds or polymerizable monomers will accelerate the cross-linking of the polyethylene. If the irradiation is done, for example, in the presence of methyl methacrylate, more irradiation is required to reduce the swelling to a given amount than is required when the polyethylene alone is irradiated.

The amount of irradiation needed to produce a gel structure of a given degree of cross-linking, or of swelling in solvents, depends in part on the initial molecular weight of the polymer. The lower the initial molecular weight, the more chance there is for part of the polymer to be in fringe structures that do not aid in holding the main gel structure together. Hence more irradiation is required to produce a gel structure of given properties with polymers of low molecular weight than for those of higher molecular weights. The distribution of molecular weights will also affect the change in gel properties with additional irradiation after the first gel is formed. This factor will, for example, make the relations between irradiation dose and degree of swelling different for linear and for branched polyethylenes of the same initial melt viscosity. However, the compounds disclosed here accelerate the cross-linking by irradiation in branched forms of polyethylene and also in linear polyethylenes.

The present invention as illustrated in the foregoing examples produces fluorocarbon-modified cross-linked polyethylenes. Evidently the function of the high speed electrons is to form free radicals, hence other methods for generating free radicals (e.g. milling the polyethylene in the presence of an organic peroxide, or in air at elevated temperature) could produce such a product only if the fluorocarbon modifier were present.

In practicing the invention, the weight ratio of polymer to monomer can be kept within appropriate limits by employing an enclosed container in which the monomer is present in gas form. In a typical case, the quantity of monomer is quite small, e.g. about 0.01% to about 1.0%. Larger amounts may be used, but this results in excessive by-product formation of polymer from monomer. Generally there is no advantage in employing more than about 10% of the weight of monomer, based on the weight of polymer.

It should be understood that the same procedures hereinabove illustrated for use with polyethylene can be followed using hexamethylene polyadipamide, polyvinyl butyral, chloropolyethylene, chlorosulfonated polyethylene, polyvinyl chloride, and other such polymers which do not degrade readily when irradiated.

The present invention is highly useful in increasing the heat resistance of polyethylene or other resin coatings, especially in connection with armature windings and the like. In general the invention may be used in applications where the resin undergoing treatment is benefited by increasing the softening temperature thereof.

I claim:

1. A process for modifying a previously existing normally-solid synthetic polymer consisting of a polymer of a vinyl hydrocarbon compound, which comprises subjecting said polymer, in contact with from 0.01% to 10.0% by weight of a monomer of the class consisting of tetrafluoroethylene, hexafluoropropene, and perfluorocyclobutene, to bombardment with high energy particle radiation for a time sufficient to achieve a dose of from 0.4 to 20 mega-roentgens, whereby cross-links are created in said polymer at a rate faster than in the absence of said added monomer.

2. Process of claim 1 wherein said polymer is polyethylene.

3. Process of claim 2 wherein the said polymer is subjected to bombardment with high energy particle radiation in the presence of tetrafluoroethylene.

4. A process for modifying a previously existing polyethylene which comprises subjecting the polyethylene to bombardment with high energy particle radiation in the presence of 0.01% to 1.0%, by weight of said polyethylene, of an added monomer of the class consisting of tetrafluoroethylene, hexafluoropropene, and perfluorocyclobutene for a time sufficient to achieve a dose of from 0.4 to 20 mega-roentgens, whereby cross-links are created in said polyethylene at a rate faster than in the absence of said added monomer.

5. A process for modifying previously existing polyethylene which comprises subjecting said polyethylene to bombardment by accelerated electrons for a time sufficient to achieve a dose of from 0.4 to 20 mega-roentgens while the said polyethylene is in contact with a monomer of the class consisting of tetrafluoroethylene, hexafluoropropene, and perfluorocyclobutene, said monomer being present as gas, in quantity of from 0.01% to 10.0% of the weight of said polyethylene, whereby cross-links are created in said polymer at a rate faster than in the absence of said added monomer.

6. Process of claim 5 wherein the quantity of said monomer is 0.01% to 1% of the weight of said polyethylene.

7. Process of claim 5 wherein the said polyethylene is in the form of film.

8. A process of claim 5 wherein said polyethylene is in the form of a "fluff" spread out to uniform thickness.

References Cited in the file of this patent

UNITED STATES PATENTS

| | | |
|---|---|---|
| 2,153,553 | Fawcett et al. | Apr. 11, 1939 |
| 2,484,530 | Schroeder | Oct. 11, 1949 |
| 2,816,883 | Larcher et al. | Dec. 17, 1957 |
| 2,830,943 | Mackenzie | Apr. 15, 1958 |
| 2,878,174 | Rainer | Mar. 17, 1959 |
| 2,957,814 | Busse et al. | Oct. 25, 1960 |

FOREIGN PATENTS

| | | |
|---|---|---|
| 1,079,401 | France | May 18, 1955 |
| | (2d addition to No. 64,192) | |
| 1,121,084 | France | Apr. 30, 1956 |

OTHER REFERENCES

Radiation Applications, "Radiation and the Polymer Industry" (March 1955).

Lawton et al.: "Nature," July 11, 1953, vol. 172, pp. 76, 77.

Manowitz: "Nucleonics," vol. 10, October 1953, pp. 18–20.

Ballatine B.N.L. 294, March 1954, 18 pages, U.S. Atomic Energy Commission document prepared by Technical Information Ser. Exten., Oak Ridge, Tennessee.